United States Patent [19]

Schultz et al.

[11] 4,351,228

[45] Sep. 28, 1982

[54] POWER ASSIST RACK AND PINION STEERING GEAR

[75] Inventors: Raymond J. Schultz, Saginaw; Michael E. Marr, Bridgeport, both of Mich.

[73] Assignee: General Motors Corporation, Detroit, Mich.

[21] Appl. No.: 165,300

[22] Filed: Jul. 2, 1980

[51] Int. Cl.³ .................... F16J 15/18; F01B 9/00
[52] U.S. Cl. .................................... 92/128; 92/136; 92/168; 180/148; 277/1
[58] Field of Search ............ 92/136, 168, 128; 180/148; 74/498; 277/1, 9, 153

[56] References Cited

U.S. PATENT DOCUMENTS

| 3,347,109 | 10/1967 | Adams et al. | 74/498 |
| 3,709,099 | 1/1973 | Dumeah | 92/136 |
| 3,908,479 | 9/1975 | MacDuff | 74/498 |
| 3,951,045 | 4/1976 | Frei et al. | 92/136 |

Primary Examiner—Paul E. Maslousky
Attorney, Agent, or Firm—Charles R. White

[57] ABSTRACT

Rack and pinion power steering gear in which an internal seal having a diameter smaller than that of the power cylinder is press fitted into a reduced diameter portion of the cylinder using the rack and piston as an installation tool.

6 Claims, 4 Drawing Figures

U.S. Patent   Sep. 28, 1982   Sheet 2 of 2   4,351,228
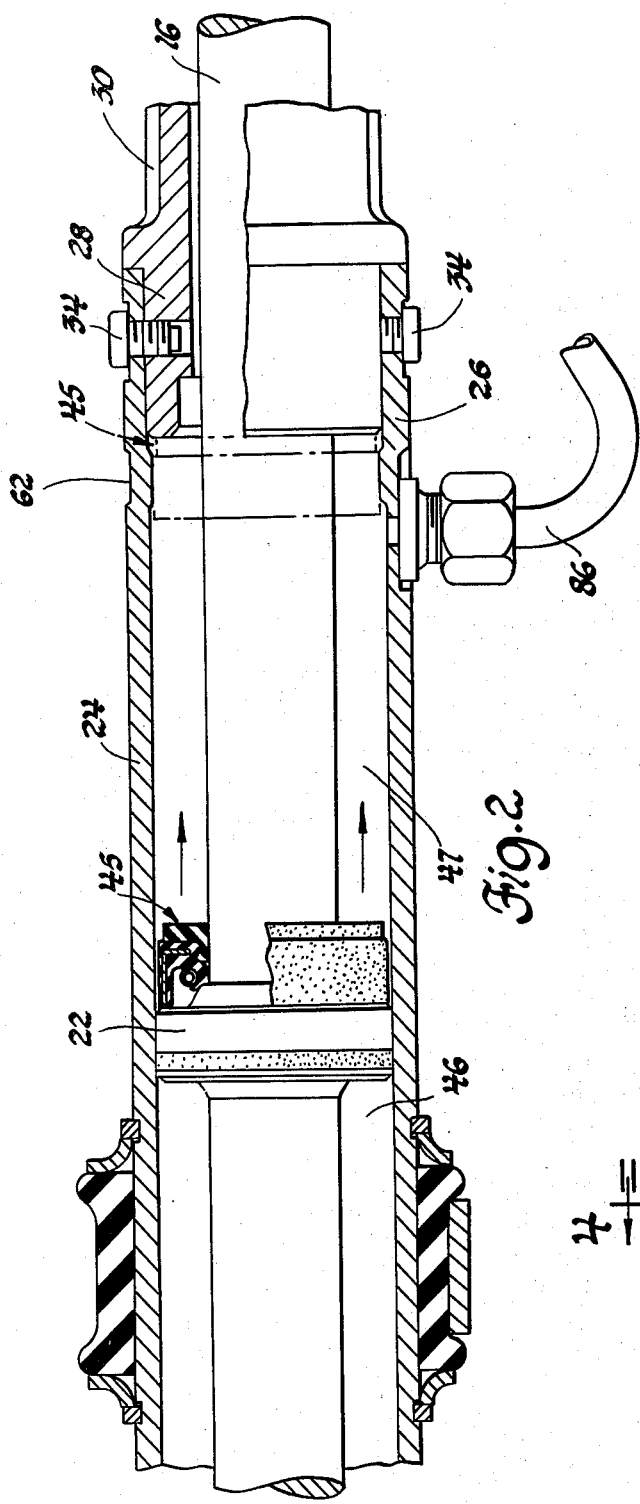
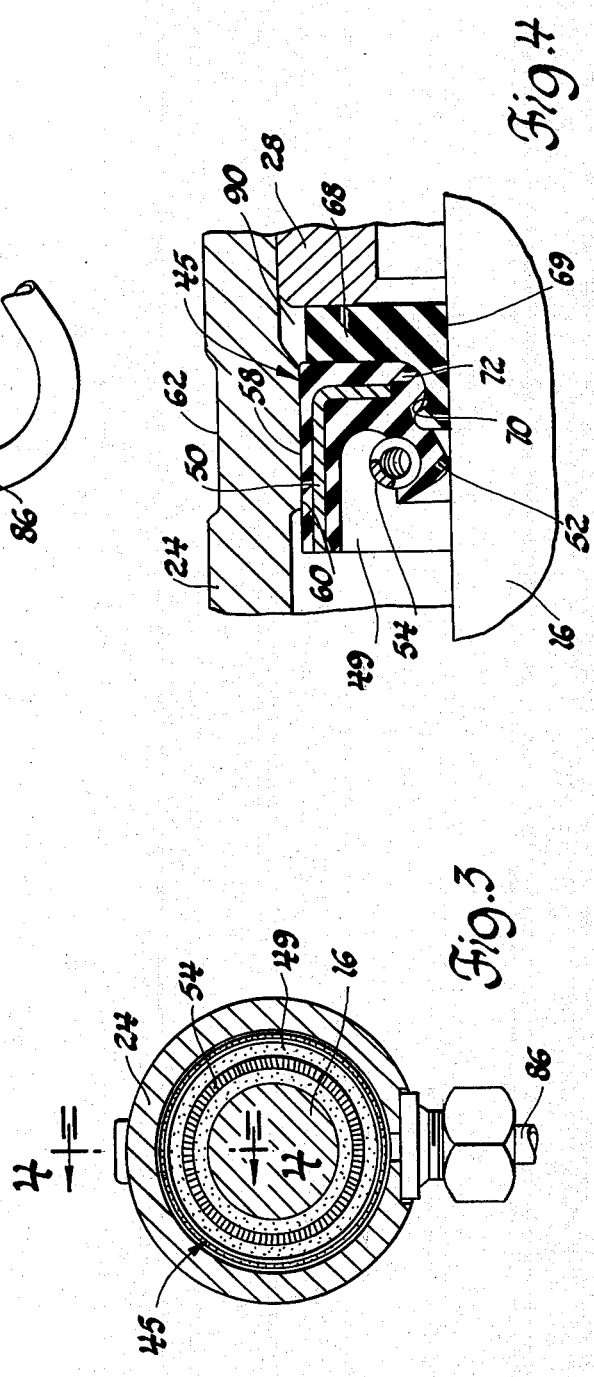
Fig. 2
Fig. 3
Fig. 4

POWER ASSIST RACK AND PINION STEERING GEAR

This invention relates to vehicle steering and more particularly to a hydraulic power assisted rack and pinion steering gear with new and improved fluid sealing internal of the gear housing. This invention also relates to a new and improved method of installing fluid seals in power assist rack and pinion gears.

Prior to the present invention, rack and pinion steering gears have been provided with pistons fixed to the racks which are slidably mounted in tubular housings or power cylinders. The piston and housing cooperates with fluid seals disposed adjacent the ends of the housing to provide fluid pressure chambers which are selectively charged from a pressure source through valving actuated by steering input to provide power assist steering. Before this invention, the initial installation and replacement of some of these seals has been difficult and costly. Often the seals were damaged in the initial buildup or during repair of these gears.

In this invention there is a new and improved sealing provision for power assist rack and pinion steering gears so that original seal installation or subsequent replacement can be easily achieved without seal damage. More particularly, in this invention, a new and improved housing and seal design allows the press fit of the inboard seal at a particular location within the tubular housing to provide for highly effective internal and external diameter sealing with respect to the housing and the rack. With this invention, the seal is easily moved into position for installation since the diameter of the tubular housing is, with the exception of the seal seat, greater than that of the seal to eliminate interference between the seal and the housing during such installation. At a particular station the internal wall of the housing is of reduced diameter to form a seal seat so that a press fit can be effected by axially forcing the seal into the seat. With the seal firmly retained in axial position within the tubular housing, the rack may be moved reciprocally in the housing with respect to the seal which provides new and improved internal and external diameter sealing.

It is a feature, object and advantage of this invention to provide a new and improved rack and pinion power steering gear having a two-pieced housing assembly and a seal assembly for hydraulically sealing the rack and housing.

Another feture, object and advantage of this invention is to provide a new and improved seal for a rack and pinion power gear which eliminates conventional O-ring seals between the power cylinder and the gear housing which eliminates the possibility of seal damage during assembly by providing an annular section or localized band of reduced diameter in the cylinder tube. The inboard rack seal passes freely without interference to the inside diameter of the tube substantially for its entire length before final seating in the reduced diameter tube section and against the end of the aluminum housing.

Another object, feature and advantage of this invention is to provide a new and improved annular seal for a rack and pinion power steering gear which seal is carried by the rack into press-fitted position in a reduced diameter station within the tube and into abutment with a steering gear housing. With this invention, there is internal diameter sealing of the tube and outside diameter sealing of the rack which eliminates sealing between the tube and the housing.

Another feature, object and advantage of this invention is to provide a new and improved method of installation of a hydraulic seal in a power cylinder of a power assist rack and pinion gear in which the rack and piston are advantageously employed in press fitting an annular seal in a reduced diameter seal seat in the cylinder.

These and other features, objects and advantages will be more apparent from the following detailed description and drawing in which:

FIG. 2 is an enlarged view of a portion of FIG. 1;

FIG. 3 is an enlarged cross sectional view taken along lines 3—3 of FIG. 1 as viewed in the direction of the arrows; and FIG. 4 is an enlarged cross sectional view taken along lines 4—4 of FIG. 3 illustrating the seal and reduced diameter construction of FIG. 1.

Figure 1:
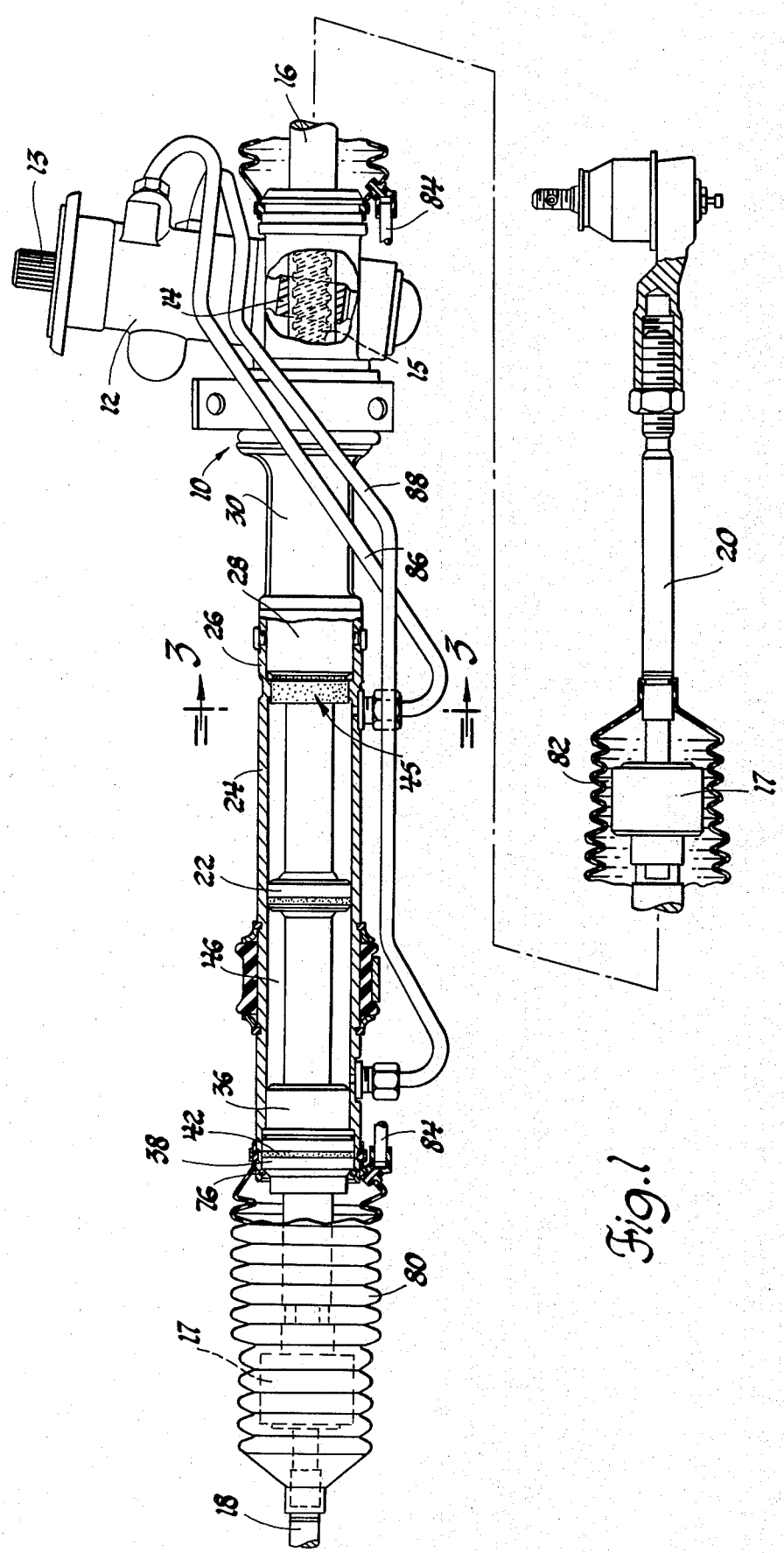
FIG. 1 is a front view of a portion of a rack and pinion steering gear with parts broken away.

Turning now in greater detail to the drawings, there is shown in FIG. 1 a rack and pinion steering gear 10 having a main housing 12 in which a stub shaft 13 and a rotary power steering valve (not shown) corresponding to that of the Ziegler et al U.S. Pat. No. 3,022,772 issued Feb. 27, 1962 hereby incorporated by reference, are operatively mounted. A pinion gear 14 operatively connected to the stub shaft 13 meshes with the teeth 15 of an elongated rack 16 that extends laterally through the main housing so that rotary movement of the pinion initiated by manual rotary steering inputs to the stub shaft 13 will produce lateral linear movement of the rack 16 to steer the front wheels of the vehicle. These wheels, not shown, are operatively connected to ball joints 17 at opposite ends of the rack 16 by tie rods 18 and 20. This rack and pinion steering gear features hydraulic power assist steering with improved fluid sealing of the gear. To this end, a piston 22 fixed at an intermediate position on the rack 16 is mounted for sliding movement in an elongated power cylinder 24, the inboard end 26 of which closely seats onto a cylndrical shouldered portion 28 of a laterally projecting extension 30 of the main housing 12. The power cylinder 24 and extension 30 are secured in axial alignment by fasteners 34 threaded through the nesting walls thereof.

As shown, the rack 16 slidably projects through an annular inner bulkhead 36 seated within the power cylinder 24 adjacent the outer end thereof. The end of the power cylinder 24 is closed by an outer bulkhead 38 also slidably receiving the rack. A seal assembly, not shown, press fitted in the outer bulkhead, has an inner annular lip which sealingly engages the outer periphery of the rack 16. A static O-ring seal 42 carried in a groove in the outer bulkhead 38 sealingly engages the inner wall of the power cylinder 24 which in conjunction with the inner seal hydraulically seals the outboard end of the power cylinder.

A special seal assembly 45 is employed to hydraulically seal the inboard end of the power cylinder 24. With the inboard and outboard seal assemblies in place fluid pressure chambers 46 and 47 are established on either side of the piston. As best shown in FIG. 4, the seal assembly 45 comprises a ring-like main seal 49 having a cylindrical thin-walled steel case 50 on which an elastomer seal body is bonded. The seal body has a primary annular sealing lip 52 for sliding sealing engagement with the outer periphery of the rack 16. It will be appreciated that the teeth 15 of the rack do not extend to this seal assembly 45 in any condition of operation so that the primary sealing lip sees only the smooth cylindrical outer surface of the rack. The garter spring 54 operatively mounted around the primary lip provides a constricting force to maintain the primary lip in close sealing engagement with the rack 16. The elastomer seal body extends around the outside of the steel case 50 and is formed with an outer cylindrical sealing surface 58 that sealingly contacts the annular reduced diameter seal seat 60 provided by swaging cylinder 24 inwardly at 62. The seal assembly also incorporates an annular flanged insert 68 of a suitable polymer material. This insert provides for increased seal stability and for improved installation and spacing of the main seal 49 in the power cylinder. In the preferred form, this insert 68 has a central annular opening 69 slidably receiving the rack and an axially extended neck formed with a circular groove 70 that provides an interlock connection for an annularly inwardly bulged collar portion 72 of the main seal. The insert 68 has a inner diameter which provides slidable fit with the circumference of the rack and the radial flange thereof is of constant width and has flat surfaces for interface fit against the end of the cylindrical shoulder 28 and the inner face of the main seal.

FIG. 2 illustrates the preferred method of installation of the seal assembly 45 into the power cylinder. The seal assembly has an outer diameter smaller than the inner diameter of the power cylinder and can be placed on the rack immediately in front of the piston before the rack is inserted into the power cylinder and main housing. With the small diameter seal and with the rack centered by the piston, the main seal will not be scrubbed along the inner wall of the power cylinder as the rack is inserted into the steering gear housing and as the piston moves the seal assembly toward the phantom line FIG. 3 position. Under these conditions, galling or other mechanical damage of the peripheral surface of the main seal does not occur. When the swaged or reduced diameter portion 62 of the power cylinder is reached, axial installation force will increase and the main seal will accordingly be constricted radially inwardly and seated in press-fit engagement with inner wall of seal seat 60. The radial flange of the insert 68 spaces the main seal in precise axial location with respect to the end of shoulder 28 so that the main seal is precisely located with respect to the reduced diameter seal seat. Additionally, the insert provides improved stabilized support to the main seal, improved sealing performance and smoother installation. With the rack 16 installed, the bulkheads 36 and 28 are secured in axial position at the outboard end of the power cylinder 24 by snap ring 76; conventional resilient boots 80, 82 of a suitable elastomer are employed to provide protective cover for the ends of rack 16 and the ball joints 17. An air line 84 is employed to pneumatically interconnect the boots for air exchange from one boot to the other as the gear is actuated to steer the vehicle to an extent causing partial collapse of one of the boots. Lines 86 and 88 are hydraulic lines operatively interconnecting the chambers 46 and 47 to the rotary valve so that hydraulic pressure can be effective to power assist rack movement in response to predetermined input into the stub shaft 13.

In the event that repair and replacement of the seal assembly 45 is desired, the rack 16 can be readily removed from the housing in conventional fashion. A seal puller with a suitably hooked end may be inserted into the power cylinder 24 so that the hook enters the access space 90 provided between the end of the main housing and seal. Since the seal assembly has only localized press fit in the power cylinder, only limited axial movement of the seal assembly from seat 60 is required before it is free for easy extraction. The reinstallation of replacement seal can be accomplished as using the rack and piston as stated above.

The detailed description and illustrations of the preferred embodiment of this invention for the purpose of explaining the principles thereof are not to be considered as limiting or restricting the invention since many modifications may be made by the exercise of skill in the art without departing from the scope of the invention as set forth in the following claims.

The embodiments of the invention in which an exclusive property or privilege is claimed are defined as follows:

1. A method of installing an annular hydraulic seal of resilient material within a rigid cylindrical body having a predetermined internal diameter greater than the external diameter of said seal comprising the steps of restricting the internal diameter of the cylindrical body at a predetermined station along its length to form a localized internal seal seat having an internal diameter less than the outer diameter of said seal, installing the hydraulic seal on a rod member adjacent an annular piston fixed thereon which slidably fits into said cylindrical body, advancing said rod, piston and seal together in a first linear direction into said cylindrical body until said seal engages said seal seat, subsequently continuing the linear advancement of said rod, piston and said seal in said body so that said seat constricts said seal radially inwardly and securely holds said seal in a fixed position with respect to said body, axially moving said rod and said piston in an opposite linear direction and with respect to said seal to a predetermined location within said body.

2. A method of installing an annular hydraulic seal of elastomeric material within a rigid cylindrical body having a predetermined internal diameter greater than the external diameter of said seal comprising the steps of restricting the internal diameter of the cylindrical body at a predetermined station along its length to form a localized annular internal seal seat having an internal diameter less than the outer diameter of said seal, establishing a stop on said body adjacent to said seal seat, installing the hydraulic seal on a rod member adjacent to an annular piston fixed thereon which slidably fits into said cylindrical body, advancing said rod, piston and seal together in a first linear direction into said cylindrical body until said seal engages said seal seat, subsequently continuing the linear advancement of said rod, piston and said seal in said body to a predetermined position established by contact of said seal with said stop, said seal seat being operative to constrict said seal radially inwardly and securely hold said seal in a fixed position with respect to said body and rod, subsequently axially moving said rod and said piston in an opposite linear direction and with respect to said seal secured in said predetermined position within said cylindrical body.

3. A hydraulically powered rack and pinion steering gear for steering the dirigible wheels of a vehicle comprising a rotatable pinion gear providing a steering gear input, an elongated rack having rack teeth in meshing engagement with the teeth of said pinion gear and linearly movable in response to rotation of said pinion gear, a housing for said pinion gear having a projecting tubular collar, a cylinder tube having a cylindrical internal wall of a predetermined internal diameter mounted on said collar and extending outwardly from said housing, a piston rod extending within said cylinder tube operatively attached to said rack, a piston having a cylindrical outer surface sealingly engaging the internal wall of said cylinder tube mounted on said rod and separating said cylinder tube into first and second pressure chambers, means for supplying pressure fluid to and exhausting fluid from said chambers, first hydraulic seal means disposed at the outboard end of said cylinder tube for slidably receiving said rod and sealing said cylinder tube and establishing the first of said pressure chambers, said cylinder tube having an annular internal seal seat directly formed therein of a diameter less than the predetermined internal diameter of said cylinder tube, and second hydraulic seal means of elastomeric material having an outer diameter less than the internal diameter of the cylinder tube and more than the internal diameter of said seal seat, said second seal means being press fitted on said seal seat in the inboard end of said cylinder tube and engaging a stop end portion of said collar to provide a dynamic seal for said rod and a static seal for the internal diameter of said cylinder tube and the end of said collar to thereby establish the second of said chambers and to inhibit the passage of hydraulic pressure fluid into said pinion gear housing from said second chamber.

4. A power assist rack and pinion steering gear for steering the dirigible wheels of a vehicle comprising a rotatable pinion gear providing a steering gear input, an elongated rack having rack teeth in meshing engagement with the teeth of said pinion gear and linearly movable in response to rotation of said pinion gear, a housing for said pinion gear having a projecting tubular collar with a stop end portion, a cylinder tube mounted on said collar and extending outwardly therefrom, a cylindrical rod extending within said cylinder tube operatively attached to said rack, a piston mounted on said rod and separating said cylinder tube into first and second pressure chambers, means for supplying pressure fluid to and exhausting fluid from said chambers, first hydraulic seal means disposed at the outboard end of said cylinder tube for slidably receiving said rod and sealing said cylinder tube to establish the first of said pressure chambers, a cylindrical seal seat formed internally in said cylinder tube having a diameter less than the internal diameter of said cylinder tube and second hydraulic sealing means comprising a ring of elastomeric material having a diameter less than the diameter of said cylinder tube fitted into said reduced diameter seal seat in the inboard end of said cylnder tube, said second sealing means contacting the stop end portion of said collar and providing a dynamic seal for said rod and a static seal for the internal diameter of said cylinder tube to establish said second chamber.

5. A power assist rack and pinion steering gear comprising a rotatable pinion gear providing a steering input, a rack having rack teeth in meshing engagement with the teeth of said pinion gear and linearly movable in response to rotation of said pinion gear, a housing for said rack and pinion gear, a cylinder tube connected to and extending outwardly from said housing, a cylindrical rod extending within said cylinder tube operatively attached to said rack, a piston mounted on said rod and separating said cylinder tube into first and second chambers, means for supplying pressure fluid to and exhausting fluid from said chambers, first hydraulic seal means disposed at the outboard end of said cylinder tube for slidably receiving said rod and sealing said cylinder tube to establish the first of said pressure chambers, an annular seal seat formed directly in said cylinder tube having a diameter less than the diameter of said tube, a ring-like main seal of elastomeric material normally sized to have an outer diameter less than the internal diameter of said cylinder tube and greater than the diameter of said seal seat, positive stop means extending into said cylinder tube for establishing the axial position of said main seal, said main seal being initially seated on said piston rod adjacent to said piston so that said main seal is centered in said cylinder tube and radially spaced from the inner wall thereof for movement axially into fixed engagement with said seat and said positive stop means, said main seal being deflected inwardly and held by said seat to establish the second of said pressure chambers and allow the subsequent relative movement of said rod relative to said main seal.

6. The steering gear of claim 5 and further having an annular insert seal of elatomeric material, interlock means interconnecting said main seal and said insert seal into a seal assembly, said insert seal being engaged with said positive stop means to locate said seal assembly axially in said cylinder tube so that said main seal is in precise axial position and in engagement with said seal seat.

* * * * *